Patented Dec. 9, 1924.

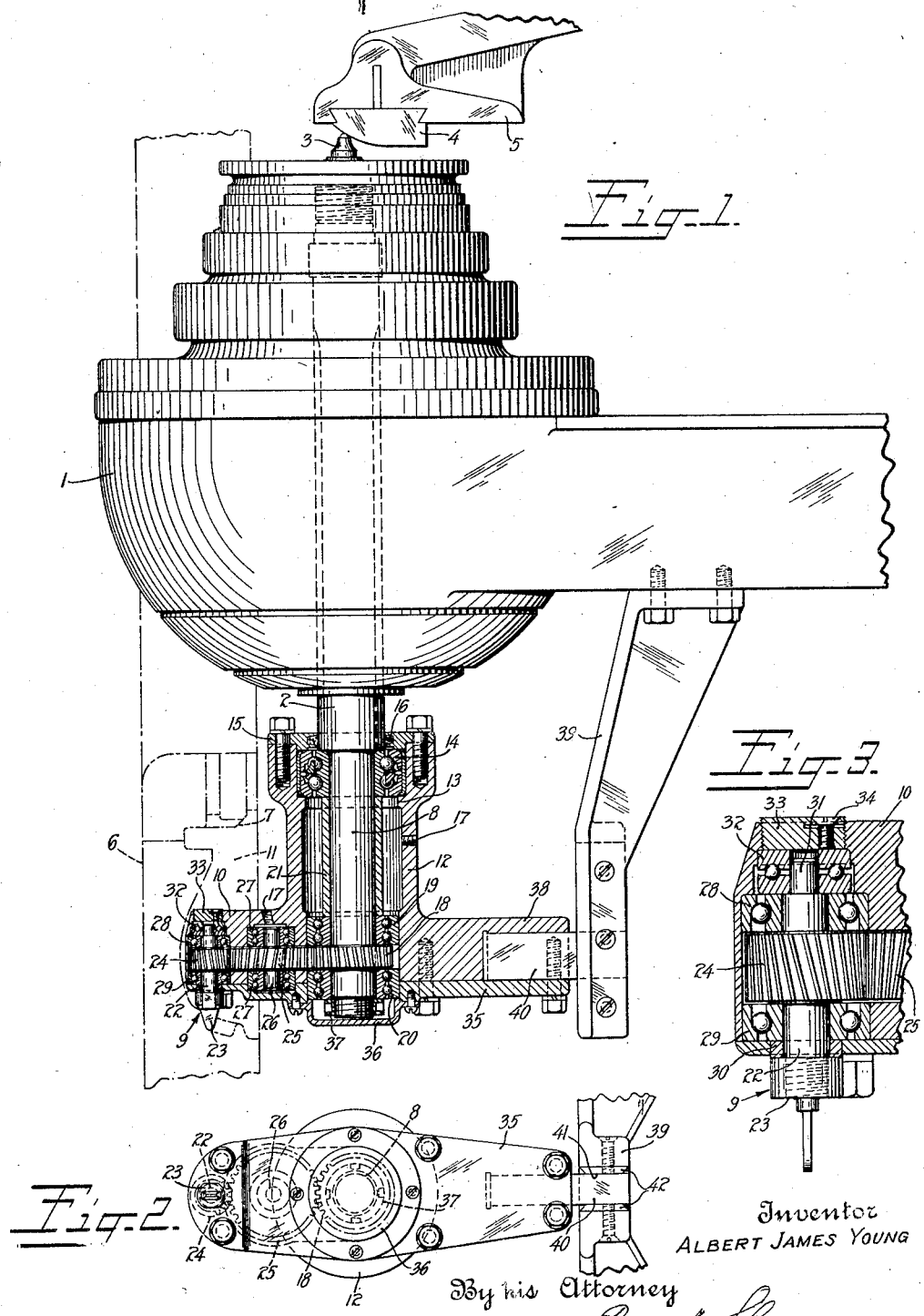

1,518,291

UNITED STATES PATENT OFFICE.

ALBERT JAMES YOUNG, OF PRESTON, ONTARIO, CANADA, ASSIGNOR TO MORGAN & WRIGHT, OF DETROIT, MICHIGAN, A CORPORATION OF MICHIGAN.

ENGRAVING MACHINE.

Application filed June 20, 1923. Serial No. 646,532.

*To all whom it may concern:*

Be it known that I, ALBERT JAMES YOUNG, a subject of the King of Great Britain, residing at Preston, Ontario, Canada, have invented certain new and useful Improvements in Engraving Machines, of which the following is a full, clear, and exact description.

This invention relates to engraving machines and its primary object is to devise means whereby certain types of engraving machines may have wider fields of employment, and more particularly to the devising of means whereby out-of-the-way surfaces may be more readily reached by the engraving tool and designs engraved thereon, that could not be produced by such machines as previously constructed.

Referring to the drawings forming a part of this specification,

Fig. 1 is a part of a known type of engraving machine in elevation showing in section the features of the present invention;

Fig. 2 is a bottom plan view of Fig. 1 showing the present invention;

Fig. 3 is an enlarged fragmental sectional elevation of the engraving tool; and

Figure 4:
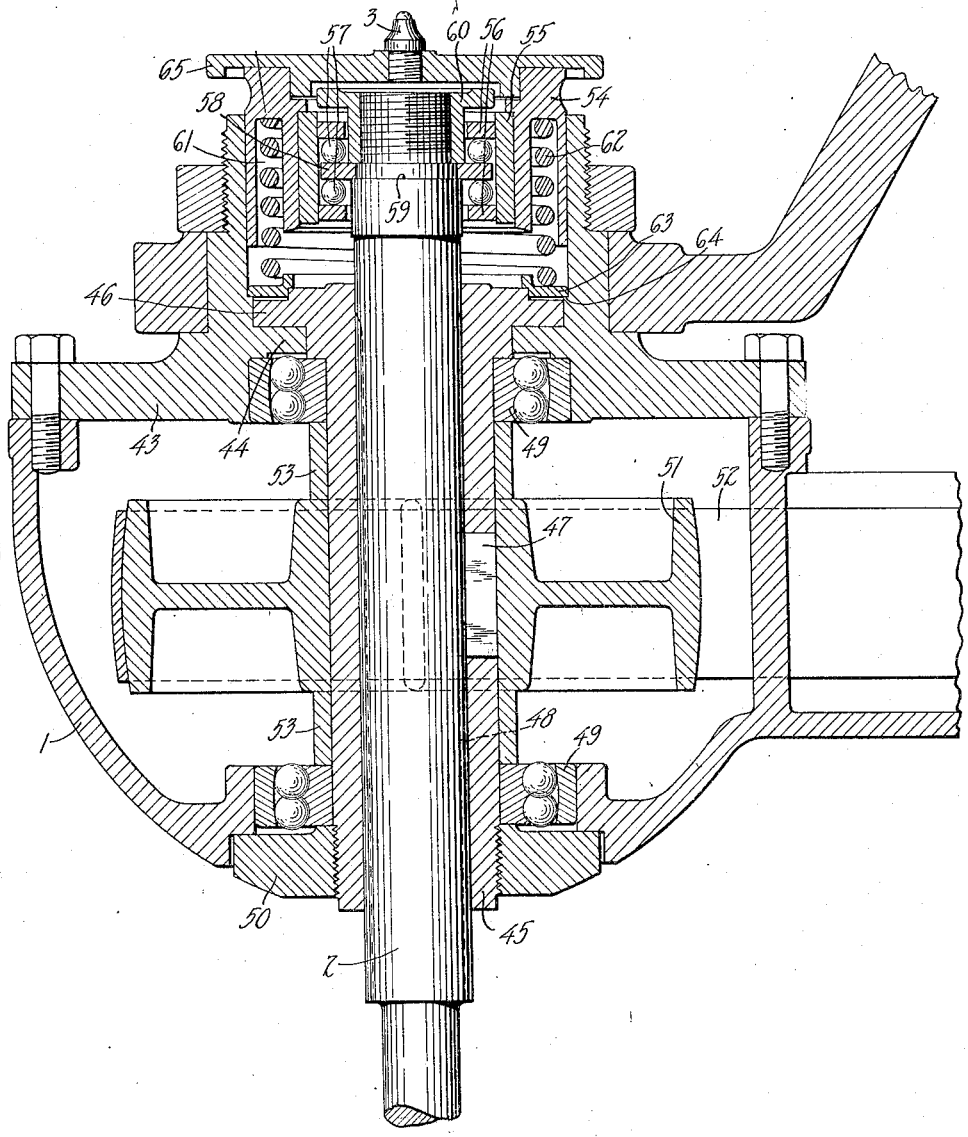
Fig. 4 is a longitudinal vertical sectional view of the casing and shaft-operating parts.

The engraving machine here shown is intended for illustrative purposes, to represent the well-known type of engraving machine manufactured by the George Gorton Machine Company, Racine, Wisconsin, and is chiefly designed for the purpose of engraving the tread-producing surfaces of molds used in the manufacture of non-skid tires.

The Gorton engraving machine comprises a casing or frame 1 through which extends a shaft 2, which in the standard machine is employed as the spindle for the engraving tool, but which in the present invention has an entirely different function. In order that the engraving tool may operate in the required manner to engrave the surface of the tire mold to produce the desired tread design the shaft of the tool must be rotated at a high speed about its own axis, must have slight axial movement, and must move in a radial plane. The Gorton machine is designed to effect these three different movements, as will later more fully appear. Only a part of the casing or frame 1 is shown in the drawings, same being broken off at one side, the remainder thereof together with the major portion of the machine, including the parts for supporting the work not being shown. It is sufficient here to state, for a clear understanding of the present invention, that in the casing or frame 1 is mounted operating mechanism, later to be described, for the shaft 2 which is operatively connected at one end to a member 3 extending from the head of the casing or frame 1 and is spring pressed upwardly, by a spring supported in the frame, later to be described, to bear continually against a block 4 having an inclined or curved profile. The block is secured to an arm 5 which is operated by mechanism not shown to move the inclined surface of the block across the end of the shaft 2 to produce the desired axial movement of the shaft. The shaft is moved in the radial plane by correspondingly moving the casing 1 which supports the shaft. This is effected by mechanism employing the well-known pantograph principle where a tracing pin at one end of the pantograph is guided over a carefully prepared copy of the design which it is desired to reproduce and the engraving tool at the opposite end of the pantograph is thereby controlled to accurately engrave this design in the tire mold. The half tire mold 6 shown fragmentally in dash and dot outline in Fig. 1 is intended to illustrate a conventional type of mold for molding anti-skid tire casings. Such molds have a portion of their surface suitably configured to mold the anti-skid design on the tread of the tire, and the principal object of the Gorton engraving machine is to engrave these configurations.

In engraving anti-skid treads of certain special designs it is often necessary to support the mold section in a plane parallel or substantially parallel to the axis of the engraving tool. The shaft 2, operating mechanism, and casing 1 of the Gorton machines already referred to have necessarily a comparatively large over-all dimension in the direction of the axis of the shaft and where the engraving tool is secured directly on the end of this shaft, as in the standard machine such a large dimension would prevent the tool from reaching the desired mold surface when the mold section is so positioned, on account of the overhanging mold parts 7 as will be obvious from an inspection of Fig. 1. Therefore this invention is directed to devising means whereby the engraving tool may be appropriately positioned relative to the main shaft 2 to reach these out-of-the-way surfaces and to engrave the desired designs thereon.

It should be noted that these machines although powerful must operate very accurately and to accomplish this are made very sensitive. They are of a size requiring a floor space of about 9 feet by 5 feet, are 12 feet high, and weigh some 18,000 lbs. They will engrave a letter "S" for illustration ½ in. high and $\frac{5}{16}$ in. deep in a forged steel mold in four minutes and in a cast iron mold in one and one-half minutes.

The machine is suitably designed to withstand the end and radial thrusts produced by the engraving tool during the rapid engraving of the various designs in these hard metal surfaces, so that, although the controlling mechanism imparts to the engraving tool the three different movements, the design on the prepared copy will be perfectly reproduced in all its detail through the operation of the sensitively constructed pantograph mechanism. To accomplish this result obviously great care must be taken to minimize the play and to provide for the wear in all the various parts of the machine.

The above brief survey perhaps will aid to an appreciation of some of the difficulties present in attempting to modify such a machine so that it will engrave surfaces hitherto impossible to reach, and at the same time will maintain the speed and accuracy necessary. In the present invention these results have been accomplished by a comparatively very simple and inexpensive attachment requiring no change whatever in the standard machine except that the engraving tool is removed from the former engraving spindle or shaft to an offset position and this shaft is employed as a main drive and support for the parts constituting the attachment.

The end 8 of the shaft is extended through the casing or frame 1 and is reduced in diameter to afford a support and bearing for the attachment, the extended portion of the shaft being made comparatively long for reasons that will presently appear. The engraving tool 9 is supported in the outer end of an arm 10 extending radially from the end 8 of shaft 2.

It has been previously stated that the shaft 2, the frame 1, and the controlling mechanism supported thereby present an over-all dimension in the direction of the axis of the shaft comparatively large, and it will now be observed that relative to this dimension the over-all dimension of the engraving tool 9 and its supporting arm 10 in the direction of the axis of this shaft is small. This is essential and enables the arm to easily enter the cavity 11 of the mold and the engraving tool to readily engrave the surfaces of the mold there presented which are impossible to reach by the engraving tool when secured to the end of the shaft 2. Furthermore it will be observed that the operating mechanism before referred to and its containing frame or casing 1 extends radially for a considerable distance in the direction of the arm 10 and to prevent this part of the machine from interfering with the arm entering the cavity 11 of the mold the projecting end of the shaft 2 is given a considerable length so that the arm 10 may be sufficiently removed from these parts to provide an adequate free space for the entrance of the parts of the mold defining the cavity above the arm 10.

The engraving tool 9 must have all three movements that it previously had when attached to the shaft 2, namely, rotation about its axis, axial movement, and movement in a radial plane. To provide for these movements in the preferred embodiment a hub 12 is formed integral with the arm 10 which is mounted on and secured to the end 8 of the shaft 2 so that the arm will move axially therewith when the shaft is under the control of the block 4, but will permit free and independent rotation of the shaft. The arm is provided with an internal flange 13 which supports the outer race of the ball-bearing 14, the inner race being disposed adjacent the shoulder formed by the shaft 2 proper and the reduced end 8 thereof whereby the bearing serves to take both the radial and end thrust transmitted from the engraving tool. A cap 15 is bolted to the end of the hub against the outer raceway of the ball bearing 14 and serves to support the hub 12 and arm 10 upon the shaft as will later more fully appear. The cap is preferably provided with a felt washer or packing 16 to prevent dust from entering the hub which latter together with the arm 10 serves as a housing for the various parts and are provided with orifices 17 in which may be inserted appropriate oil and grease cups to adequately lubricate the parts.

A gear wheel 18 is keyed to the shaft within the hub 12 at some distance from the ball-bearing 14 and two sets of ball-bearings 19—20 for taking radial thrusts are mounted between the hub and shaft on either side of the gear 18, a spacing sleeve 21 being mounted on the shaft between the bearings 14 and 19. The engraving tool 9 comprises a spindle 22 and the cutting tool proper 23. The spindle is disposed in the outer end of arm 10 and the cutting tool 23 is detachably secured to an end of the spindle extending from the arm whereby the tool may be easily removed and replaced by another. The shaft 2 is operably connected with the engraving tool through the gear 18, a gear 24 preferably made integral with the spindle 22 and an intermediate gear 25 secured on a spindle 26 mounted in the ball-bearings 27—27. The gears 24 and 25 are housed in the arm 10 in alignment with gear 18, and the three gears are preferably helical to minimize the chatter and to reduce to some extent the effect of the thrust produced by the cutting tool.

In order to reach the desired distance in the cavity of the mold the engraving tool is placed as near the end of the arm as possible and the over-all dimension of the arm and tool in the direction of the axis of the shaft 2 is likewise made as small as possible as before remarked. This necessarily limits the amount of space in the end of the arm for the engraving tool and the associated parts required for taking care of the end and radial thrusts produced by the engraving tool during the engraving operation and permitting the tool to revolve at the high speed required. To provide for this, semi-thrust and radial ball-bearings 28 and 29 are mounted on the spindle at either side of the gear 24, and between the bearing 29 and the cutter 23 a collar 30 is mounted on the spindle for transmitting the thrust from the tool as will presently be seen. The opposite end 31 of the spindle is reduced in diameter to form a shoulder. A thrust ball-bearing 32 is mounted on this reduced end of the spindle to seat upon the shoulder and the inner race of the ball-bearing 28. This thrust bearing 32 receives substantially all of the end thrust of the cutting tool and the manner of transmitting it through the collar 30 and inner raceways of the ball-bearings 28 and 29, as well as the spindle itself, increases the surface receiving the thrust and thereby produces the maximum effectiveness for the amount of space available. A plug 33 is screwed in the arm adjacent the ball-bearing 32 which may be easily adjusted to take up any wear of the parts, a locking screw 34 being provided for locking the plug in its adjusted position in a well-known manner. A cap 35 is bolted over the end of the arm and hub which serves to retain the bearings 27 and 29 in place. Another cap 36 is screwed upon the cap 35 and serves to retain the ball bearing 20 in place. The attachment is secured upon the shaft 2 by means of a nut 37 screwed on the end of the shaft and all that is necessary in removing the attachment from the shaft is to remove the cap 36 and the nut 37. The entire attachment may then be withdrawn from the shaft 2.

The attachment is firmly held with minimum play upon the shaft 2 between this nut 37 and the shoulder formed in the shaft 2 by the reduced end 8, and as the play and wear is taken care of in the engraving tool parts at the end of the arm 10 as already described, the slightest axial movement of the shaft 2 in either direction produced by the block 4, will be imparted to the engraving tool 9 so that it will operate in this regard as if it were secured directly to the end of the shaft 2 as in the standard machine.

It is obvious that the hub 12 and arm 10 must be fixed against rotation which may be done in several ways. In the present instance the arm is secured to the frame 1. This presents an easy means of holding the arm against rotation, and as the frame is moved bodily in the radial plane this affords a simple means of likewise moving the arm and engraving tool in this plane. Special means, however, are provided for permitting the arm and engraving tool to move in an axial direction with the shaft 2. This is preferably accomplished by forming an arm 38 on the hub 12, that is to say forming it integral with the arm 10, and connecting it by tongue and groove connections with a bracket 39 secured to the frame 1. The connection should present as little play as possible and in the present instance a bar 40 is held in a socket in the arm 38 by means of the cap 35 having its outer end projecting in a slot 41 formed in the bracket 39 directed parallel with the shaft 2. The slot is provided with the wear plates 42 and is of sufficient length to permit of the axial movement required to produce the engravings on the concave or arcuate surface of the mold wall. It is also made of sufficient length so that shafts of different lengths may be substituted for the shaft 2 to accommodate the machine to different sized molds, and the slot is preferably open at the outer end in order that the attachment may be bodily removed from the shaft 2 as already described.

As has been already stated it is of primary importance that the engraving tool make an accurate reproduction of the copy which controls the movement of the pantograph. Therefore to minimize the effect on the tool of the play between the shaft and the hub 12 the latter is made long relative to the arm 10, the reduced portion of the shaft being made correspondingly long to accommodate a hub of such length. And likewise to minimize the effect on the tool of the play in the tongue and groove securing means, the arm 38 is formed long in comparison to the arm 10.

The shaft-operating mechanism shown in Figure 4 and previously briefly referred to will now be described more in detail, although it should be borne in mind that this mechanism is a feature of the standard Gorton machine and comprises no part of the feature added thereto by the present invention. The casing 1 through which the shaft 2 passes is hollow and open at both ends. The top of the casing is provided with a closure 43 bolted thereto. The closure is centrally orificed and provided with an interiorly extending flange 44 for supporting a bushing 45 by engagement with the outwardly extending flange 46 formed thereon. The bushing is mounted on the shaft 2 and secured thereto by means of the key 47 which engages a longitudinally extended key-way 48 formed in the shaft whereby the shaft is permitted to move longitudinally while it revolves in unison with the bushing. The bushing is rotatably mounted in the casing by means of the ball bearings 49 and is secured against longitudinal movement by means of a screw cap or nut 50 screwed upon the end thereof and abutting the shouldered lower orifice of the casing. A belt wheel 51 is mounted on the bushing 45 which is connected to the drive (not shown) of the Gorton machine to the right of Figure 4 by means of a belt 52. The belt wheel 51 is spaced from the bearings 49 by means of collars 53. The construction thus far described permits of the rotation of the shaft 2 while leaving it free to move longitudinally, the driving parts, namely the bushing 45 and belt wheel 51 being secured against such longitudinal movement.

An orificed head indicated generally by the numeral 54 is engaged by the orifice formed in the closure 43. A bushing 55 having two raceways 56 secured therein is secured in the orifice of said head. These raceways engage two sets of ball bearings 57 between which is a third raceway 58 secured on the shaft 2 between the shoulder 59 formed on the shaft and a collared nut 60 screwed upon the end of the shaft. This construction secures the shaft and head together whereby the shaft will be permitted to revolve independently of the head but longitudinal movement of the head will produce a similar movement of the shaft.

The head is chambered out to provide a housing 61 in which is mounted a coiled spring 62 which is supported upon a ring 63 resting on a shoulder 64 formed in the orifice of the closure 43. The head 54 is provided with a cap 65 which is tapped to receive the member 3. This member is maintained in continual engagement with the block 4 by means of the upward thrust of the spring 62. By this construction the shaft will be forced longitudinally in one direction against the pressure of the block 4 and will be returned automatically by the spring 62 whenever the block by its movement permits of such return. The shaft thus responds in its longitudinal movement to the control of the block 4 in accordance with the profile formed upon the block.

The mechanism above described permits the cutting tool to move longitudinally in its work in a predetermined manner simultaneously with its rotation and with its movement in a radial plane produced by the bodily movement of the casing as has been previously described.

The attachment thus described has been found to be very durable. The thrusts in the various directions and the effect of the play and the wear of the parts have been effectively taken care of so that the off-set engraving tool responds accurately to the three different movements of the shaft 2 and engraves a reproduction of the copy as satisfactorily as if the tool were attached directly to the shaft.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. An engraving machine comprising a rotatable and axially movable shaft and operating mechanism at one end thereof, the over-all dimension in the direction of the axis of the shaft being comparatively large, a rotatable and axially movable spindle spaced radially from the opposite end of and parallel to said shaft, a cutting tool mounted on the end of said spindle having a cutting edge axially beyond the spindle, and a rigid integral radially extending arm fixed against rotation about the shaft connecting said shaft and spindle in fixed spaced relation, the over-all dimension of said spindle, cutting tool, and arm, in the direction of the axis of the shaft being small relative to said first over-all dimension, and means adapted to transmit the rotatable and axial movements of the shaft to the spindle whereby the cutting tool will be rotated and moved axially, part of said means being connected to said spindle at a distance from the cutting tool.

2. An engraving machine comprising a rotatable shaft movable axially and in a radial plane and operating mechanism at one end thereof, the over-all dimension in the direction of the axis of the shaft being comparatively large, a rotatable spindle spaced radially from the opposite end of and parallel to said shaft, a cutting tool mounted on the end of said spindle having a cutting edge axially beyond the spindle, and a rigid integral radially extending arm fixed against rotation about the shaft connecting said shaft and spindle in fixed spaced relation, the over-all dimension of said spindle, cutting tool, and arm, in the direction of the axis of the shaft being small relative to the said first over-all dimension, and means including said arm adapted to transmit the said various movements of the shaft to the spindle, part of said means being connected to said spindle at a distance from the cutting tool.

3. An engraving machine comprising a rotatable and axially movable shaft, operating mechanism at one end thereof, and a supporting frame therefor, having a comparatively large over-all dimension in the direction of the axis of the shaft, a rotatable spindle spaced radially from the opposite end of and parallel to said shaft, a cutting tool mounted on the end of said spindle having a cutting edge axially beyond the spindle, and a rigid integral radially extending arm connecting said shaft and spindle in fixed spaced relation, the over-all dimension of said spindle, cutting tool, and arm, in the direction of the axis of the shaft being small relative to said first over-all dimension, means operably connecting the shaft with the spindle at a distance from said cutting tool, and means connecting the arm with the frame adapted to hold the former against rotation about the shaft but permitting it to move axially therewith.

4. An engraving machine comprising a rotatable shaft and operating mechanism at one end thereof, the over-all dimension in the direction of the axis of the shaft being comparatively large, a rotatable spindle spaced radially from the opposite end of and parallel to said shaft, a cutting tool mounted on the end of said spindle having a cutting edge axially beyond the spindle, and a rigid integral radially extending arm fixed against rotation about the shaft connecting said shaft and spindle in fixed spaced relation, the over-all dimension of said spindle, cutting tool, and arm, in the direction of the axis of the shaft being small relative to said first over-all dimension, a comparatively long hub on said arm for mounting it on the shaft to minimize the effect on the tool of the play between the shaft and hub, and means operably connecting the shaft and spindle at a distance from said cutting tool.

5. An engraving machine comprising a rotatable and axially movable shaft and operating mechanism at one end thereof, the over-all dimension in the direction of the axis of the shaft being comparatively large, an arm at the opposite end of the shaft and a rotatable engraving tool at the outer end of the arm, the over-all dimension in the direction of the axis of the shaft being small relative to said first over-all dimension, a second arm integral with the first arm, means for securing the second arm at its outer end to permit the arms and tool to move with the shaft in its axial movement but to prevent rotation thereabout said second arm being comparatively long to minimize the effect on the tool of the play in the securing means, and means operably connecting the shaft and tool.

6. An engraving machine comprising a rotatable and axially movable shaft and operating mechanism at one end thereof, the over-all dimension in the direction of the axis of the shaft being comparatively large, an arm at the opposite end of the shaft and a rotatable engraving tool at the outer end of the arm, the over-all dimension in the direction of the axis of the shaft being small relative to said first over-all dimension, a comparatively long hub on said arm for mounting it on the shaft to minimize the effect on the tool of play between the shaft and hub, a second arm integral with the first arm, means for securing the second arm at its outer end to permit the arms and tool to move with the shaft in its axial movement but to prevent rotation thereabout said second arm being comparatively long to minimize the effect on the tool of play in the securing means, and means operably connecting the shaft with the tool.

7. An engraving machine comprising a rotatable and axially movable shaft and operating mechanism at one end thereof, the over-all dimension in the direction of the axis of the shaft being comparatively large, an arm at the opposite end of the shaft and a rotatable engraving tool at the outer end of the arm, the over-all dimension in the direction of the axis of the shaft being small relative to said first over-all dimension, means operably connecting the shaft with the tool, a hub on said arm for mounting it on the shaft, a second arm on the hub, means for securing the second arm at its outer end to permit the arms and tool to move with the shaft in its axial movement but to prevent rotation thereabout, and detachable means for securing the hub upon the shaft whereby, by the removal of the said detachable means, the hub and its associated parts may be removed from the shaft as a unit.

Signed at Galt, in the Province of Ontario, Dominion of Canada, this 14 day of June, 1923.

ALBERT JAMES YOUNG.